US012656316B2

(12) United States Patent　(10) Patent No.:　US 12,656,316 B2
Jones　(45) Date of Patent:　Jun. 16, 2026

(54) IONISATION CHAMBERS

(71) Applicant: THE SECRETARY OF STATE FOR DEFENCE, London (GB)

(72) Inventor: Morgan Jones, Reading (GB)

(73) Assignee: The Secretary of State for Defence, London (GB)

( * ) Notice: Subject to any disclaimer, the term of this patent is extended or adjusted under 35 U.S.C. 154(b) by 150 days.

(21) Appl. No.: 18/688,250

(22) PCT Filed: Aug. 31, 2022

(86) PCT No.: PCT/IB2022/058181
§ 371 (c)(1),
(2) Date: Feb. 29, 2024

(87) PCT Pub. No.: WO2023/031826
PCT Pub. Date: Mar. 9, 2023

(65) Prior Publication Data
US 2025/0130200 A1　Apr. 24, 2025

(30) Foreign Application Priority Data

Sep. 3, 2021　(GB) ...................................... 2112564

(51) Int. Cl.
　*G01N 27/64*　(2006.01)
　*C08J 5/18*　(2006.01)
　*H01J 47/02*　(2006.01)
(52) U.S. Cl.
　CPC .............. *G01N 27/64* (2013.01); *H01J 47/02* (2013.01); *C08J 5/18* (2013.01); *C08J 2323/08* (2013.01)
(58) Field of Classification Search
　CPC ...... G01N 27/64; G01N 27/62; G01N 27/623; H01J 47/02; C08J 2323/08; C08J 5/18

USPC ......................................................... 324/464
See application file for complete search history.

(56) References Cited

U.S. PATENT DOCUMENTS

| | | | |
|---|---|---|---|
| 3,665,189 | A | 5/1972 | Maillot |
| 4,302,696 | A | 11/1981 | Wakayama et al. |
| 4,445,037 | A | 4/1984 | Anderson |
| 6,734,433 | B1 | 5/2004 | Meunier et al. |
| 2004/0079879 | A1* | 4/2004 | Ross ..................... H01J 49/168 250/287 |
| 2010/0012851 | A1 | 1/2010 | Bolotnikov et al. |

(Continued)

FOREIGN PATENT DOCUMENTS

WO　2007060138 A1　5/2007

OTHER PUBLICATIONS

WO 2007/060138 machine translation, May 31, 2007 (Year: 2007).*

(Continued)

*Primary Examiner* — Raul J Rios Russo
(74) *Attorney, Agent, or Firm* — Kilpatrick Townsend & Stockton LLP

(57)　ABSTRACT

The invention provides for an ionisation chamber suitable for the detection of radioactive gas in air. The chamber has an annular collection electrode and an annular polarising electrode, each electrode having a diameter, a proximate end and a distal end, the proximate ends of both electrodes being fixed at a base plate, wherein each electrode is supported by an insulator, wherein the insulator supporting polarising electrode comprises an outer ring and an inner ring, the outer ring having a diameter corresponding that of the polarising electrode.

11 Claims, 5 Drawing Sheets

(56)  References Cited

U.S. PATENT DOCUMENTS

Figure 1A:
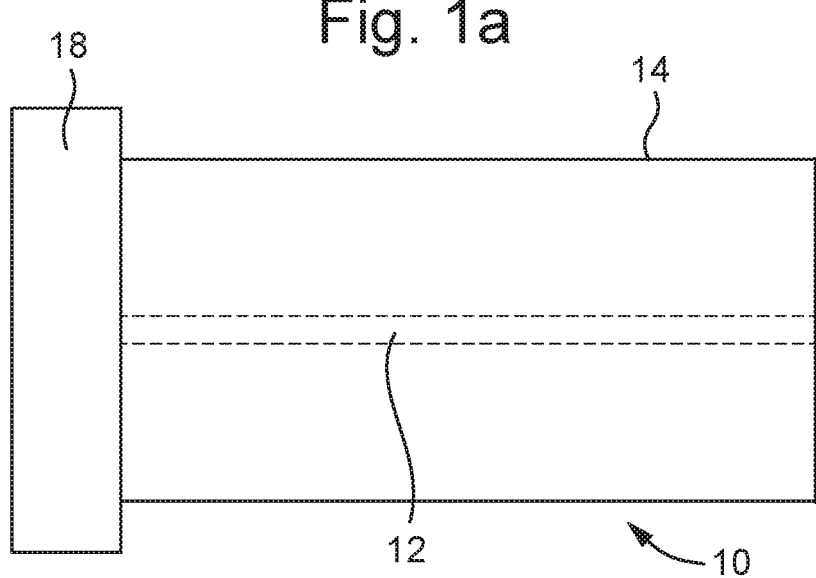

| | | | | |
|---|---|---|---|---|
| 2010/0038528 | A1* | 2/2010 | DeWerd | G01T 1/185 |
| | | | | 250/382 |
| 2013/0265574 | A1* | 10/2013 | Buckley | G01N 21/67 |
| | | | | 356/313 |
| 2015/0279642 | A1* | 10/2015 | Prance | H01J 49/26 |
| | | | | 250/281 |
| 2020/0348220 | A1* | 11/2020 | Kanno | B03C 3/017 |
| 2022/0034841 | A1* | 2/2022 | Shinada | G01N 27/70 |

OTHER PUBLICATIONS

United Kingdom Patent Application No. GB2112564.6, Combined Search and Examination Report mailed Mar. 4, 2022, 2 pages.
International Patent Application No. PCT/IB2022/058181, International Search Report and Written Opinion mailed Dec. 5, 2022, 13 pages.
United Kingdom Patent Application No. GB2212706.2, Examination Report mailed Nov. 27, 2023, 3 pages.
Brunbauer et al., "3D printing of gaseous radiation detectors", Journal of Instrumentation, Dec. 9, 2019, vol. 14, No. 12, 12 pages, Institute of Physics Publishing, Bristol, GB.

* cited by examiner

Fig. 4

42

42

IONISATION CHAMBERS

This invention relates to Ionisation Chambers. Ionisation chambers are relatively cheap and unsophisticated detectors which can be used to detect ionising radiation and are useful in environments where radioactive gas in air detection is needed.

At their simplest they comprise two coaxial cylinders, often with an outer circular polarising electrode and an inner collection electrode. These are anchored at one end, and a gas between them provides the means of creating electron-ion pairs when ionising radiation interacts with it. The cheapest and most readily available gas is air.

The central electrode is connected to an electrometer and the polarising electrode is supported from the chassis on a substantial insulating disc. Used in this way, a disc is a poor shape for an insulator because the cross-sectional area is large and the length short, minimising resistance.

Chambers for gas-in-air monitoring make the polarising electrode porous (rolled perforated sheet) and need a totally enclosing but gas-permeable earth-bonded conductive external screen to allow measurements down to single-digit fA without suffering mains hum. Applying a polarising voltage (typically <1 kV) to the polarising electrode splits the electron-ion pairs and causes a current to flow in the external circuit between polarising and central electrode. An electrometer connected to the central electrode senses this external current and converts it into a voltage proportional to the number of electron-ion pairs, and therefore proportional to the radiation energy deposited in the gas.

Air requires ≈32 eV of deposited energy to form an electron-ion pair, so currents are small, making interference and electronic noise significant. Once mains hum has been eliminated, the next noise source is the polarising supply. Greatly simplified, the combination of a polarising supply, ionisation chamber, and electrometer is an inverting op-amp with gain set by the ratio of capacitances.

$$\text{gain} = -\frac{C_{fbk}}{C_{chamber}}$$

Where:

$C_{fbk}$=value of feedback capacitance in the electrometer
$C_{chamber}$=capacitance from central electrode to polarising electrode Typical chamber capacitance is 4-7 pF, as is electrometer feedback capacitance, effectively making a unity gain inverter. It is not uncommon for the output of an electrometer to be significant to 1 mV or less. Thus, noise on the polarising supply needs to be 1 mV, or less, and in a 1 kV supply this means the noise must be at most one part per million to be effective. Controlling the noise at the very small currents being detected (fA range) is a significant challenge.

To ease the polarising supply noise problem, ionisation chambers are generally designed to minimise chamber capacitance, and one way to achieve this is to truncate the central collection electrode's length by one chamber radius. Depending on chamber aspect ratio, this shortening reduces capacitance by ≈20%. Unfortunately, the electrode is now a beam supported at one end. The electrode has mass and compliance, so it resonates mechanically. Movement changes chamber capacitance and produces an unwanted electrical output from the electrometer, exacerbated by the mechanical resonance. These changes in capacitance lead to the system acting as a microphone, which is undesirable and reduces the accuracy of the system. The problem is minimised by making the central electrode from a metal such as tubular aluminium, or brass to minimise mass and maximise rigidity, but the design remains susceptible to microphony.

The shortened electrode design may modify the shape of the polarising electrode to have a hemispherical end (centred on the tip of the collection electrode), causing it to be known as a thimble chamber. Such a shape is strong, so gamma sensitivity may be increased by pressurising the enclosed gas (more atoms to interact with incoming gammas).

The central collection electrode is supported on an insulator and it would seem obvious to minimise leakage currents by maximising leakage resistance, so ceramic (alumina, aluminium oxide, sometimes called sapphire by marketing) or Perspex (methyl methacrylate) insulators are common. It is convenient for all connections and mounting fixtures to be at one end, so thimble chambers are commonly built up from a substantial base plate. If the base plate is conductive, it forms an electrical guard between central collection electrode and polarising electrode, dramatically reducing leakage currents. An air monitor's polarising electrode is commonly made by rolling perforated aluminium sheet into a cylinder, with a disc of perforated aluminium welded to one end to form a porous can whose open end fits onto a metal hub insulated from the base plate.

An apparently obvious solution would be to clamp or secure the inner tube at the free end in some way. However, given the very low signal output, the potential for current leakage at the newly clamped end is significant. Supporting the central electrode and polarising electrode from both ends permits a more robust structure, but two supports halve leakage resistance. Further, lengthening the central collection electrode increases chamber capacitance. A more rigid fixing is likely to lead to unacceptably large leakage yet a less secure fixing increases microphony, provoked by external sources such as building vibration, pumps etc.

To maximise electrical resistance, an insulator should be long and thin. In an ionisation chamber, as noted above, the support for the polarising electrode tends to be short and fat—it's a simple and easy solution. It is clear that this geometry sacrifices leakage resistance for stability, but this design compromise leads to poor performance and thereby, erroneous readings It is an object of the present invention to provide a cheaper ionisation chamber for more accurate detection of lower levels of radioactive gas in air. Accordingly the invention provides an ionisation chamber, having an annular collection electrode and an annular polarising electrode, each electrode having a diameter, a proximate end and a distal end, the proximate ends of both electrodes being fixed at a base plate, wherein each electrode is supported by an insulator, wherein the insulator supporting the annular polarising electrode comprises an outer and an inner ring, said rings being concentric, the outer ring having a diameter corresponding to the diameter of the outer ring of the annular polarising electrode, and where in the concentric rings have an electrically resistive material between them formed into spokes. Ideally, both electrodes will have this arrangement of concentric rings. For the collection electrode the hub of the inner ring will have a smaller diameter to mount that ring, whilst the hub of the rings configured to mount the annular polarising electrode may be of a greater diameter to permit the collection electrode to pass through.

Conveniently, each electrode's support would be made from a pair of concentric rings of a diameter to correspond to the diameter of the electrodes. The two concentric rings would be connected by spacers, spokes or limbs fabricated from the same insulating material. In doing this, the electrical paths change from a short conductive path through a large cross sectional area to a longer path through a small cross sectional area.

The diameters of the rings and the electrodes do not have to be exactly the same, but sufficiently similar to provide an effective insulating mount.

By careful selection of the shape of the insulating ring, in this case a tri-spoke wheel, leakage resistance is increased by orders of magnitude when compared to the prior art of the insulating block.

For ease of manufacture, it is possible that the collection electrode could be mounted at the centre of an insulating disc that would then be fixed onto the chamber a part of a removeable mounting. This may sacrifice some resistance for ease and simplicity of manufacture Using 3 D manufacturing techniques such as additive manufacturing, these can be made so that the spokes are hollow. This increases the stiffness of the limb for a given electrical cross-sectional area, assisting vibration control etc.

For stability, the three spokes are spaced regularly around the circles at 120° have been used and the hollow cross sections maximise rigidity.

By choosing an appropriate insulating material and ensuring the spokes are hollow, the resistance can be made sufficiently low to remove the need for trade-offs as set out above. A typical shape would be a tri-spoke wheel—this gives sufficient rigidity to minimise microphony effects but reduces the number of leakage paths, thereby maximising resistance.

Although it is possible to have more than one such support along the conducting electrode, a single support at or near the distal end would appear to be optimal in terms of balancing rigidity and minimising electrical leakage.

The hollow cross sectional profile of the spokes can be circular, or oval or any other shape that the system demands and similarly, whilst leakage and movement considerations will dictate that the smallest diameter rigid configuration is likely to be optimal, this may not be thin spokes, and will likely be dictated by the specific geometry of that detector in an application.

It is accepted that a geometric examination of these spokes might provide a more effective insulation or stability. These are design considerations that will be dependent on the function of the ion chamber. However, given the low tech applications of these devices, the other trade off of production cost is also a consideration and it is considered that for most applications a simple tri-spoke wheel on which to mound the two ends of the two electrodes would meet current detection requirements In the current example, the insulating rings were made from Poly Lactic Acid (PLA) which is a standard material for 3-D printing. However, it has poor electrical performance and much better results would be achieved with an explicit insulator such as PolyEthylene Terephthalate (PET) or other materials as may be selected to meet a particular design application. However, even with a poor electrical performer such as PLA, the design and geometry showed significant improvement over the prior art.

Conveniently the material is fabricated using 3 D Printing techniques to maximise the ability to make a hollow profile with minimal complex manufacturing techniques It is known Tritium-in-air monitors are notorious for needing considerable settling time after switch-on. It is considered that one reason for such a delay in the current design may be because the collection wheel spokes were close to the (conductive) inner hub of the polarising electrode, possibly inducing charge onto collection wheel spokes.

This can be mitigated by placing an earthed conductive disc to guard between the two wheels, shielding the collection wheel from the polarised central hub. If the guard also includes a central earthed conductive sleeve that intrudes a short distance into the polarising electrode, the effect is to significantly chamber capacitance.

The invention will now be described with reference to the following drawings

Figure 1B:
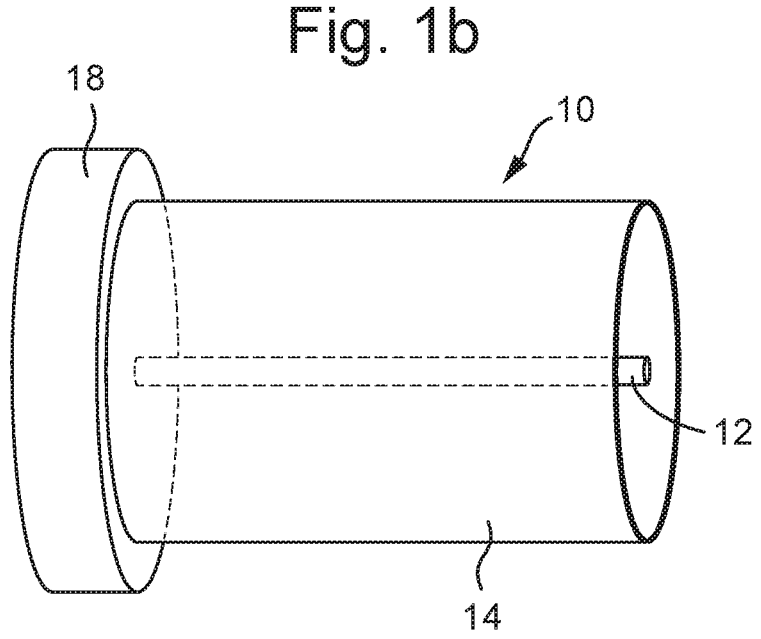
Figure 2A:
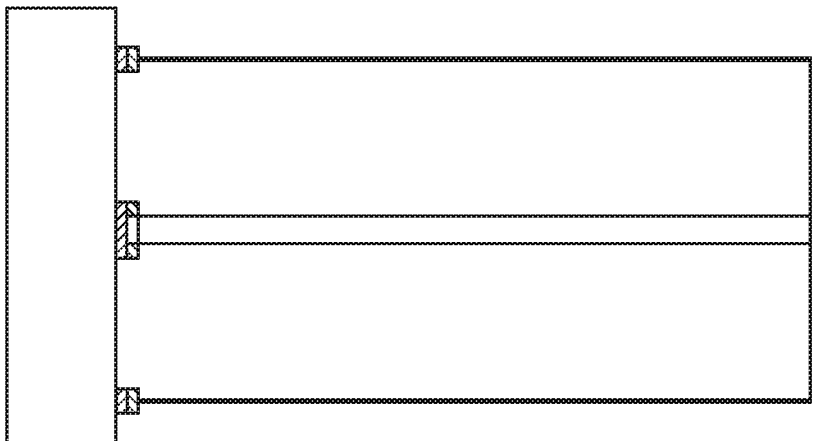
Figure 2B:
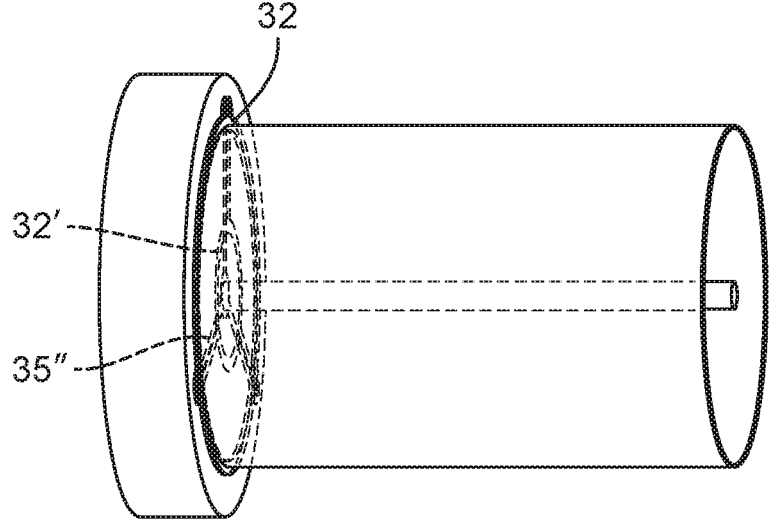
Figure 3:
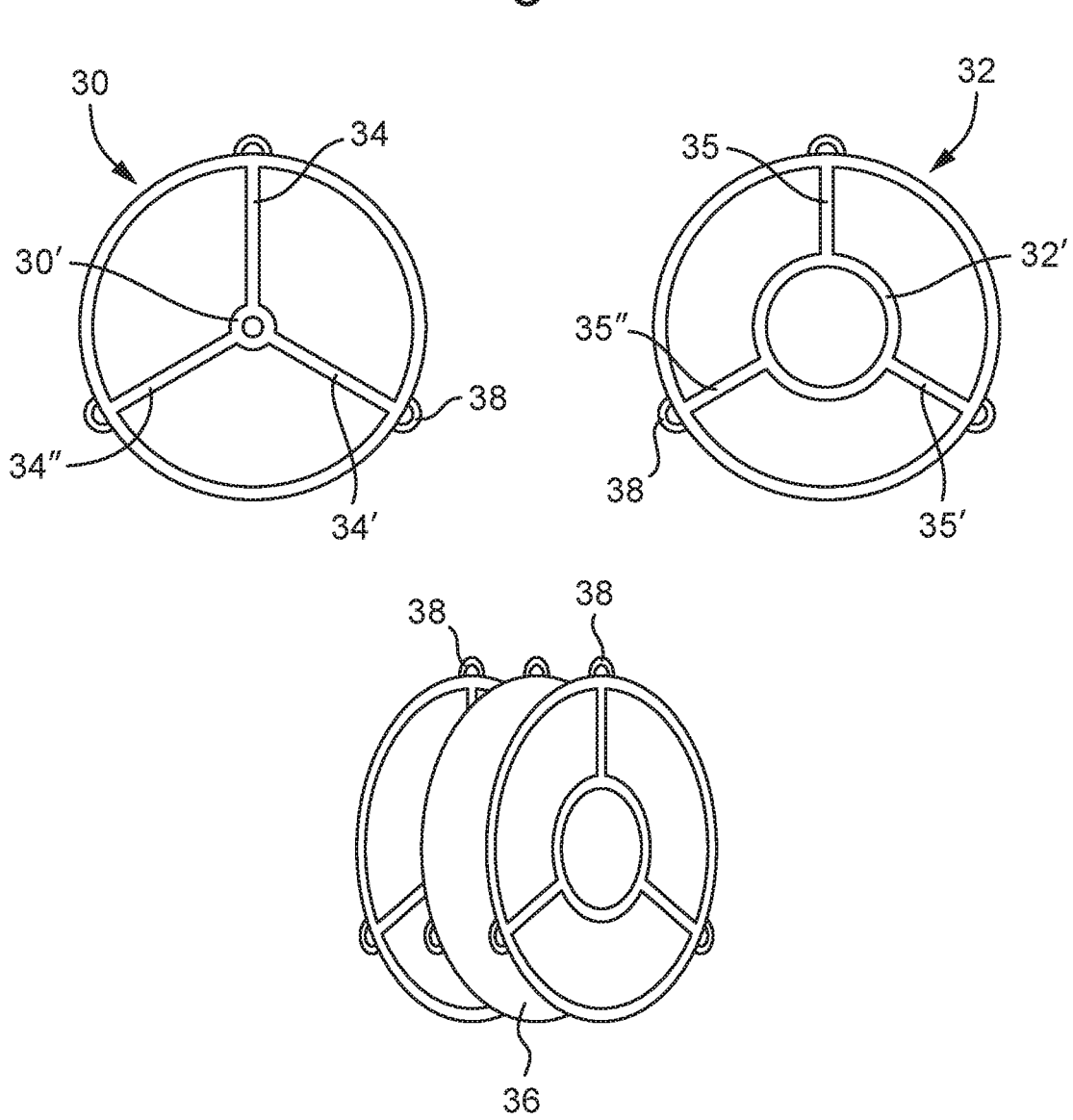
Figure 4:
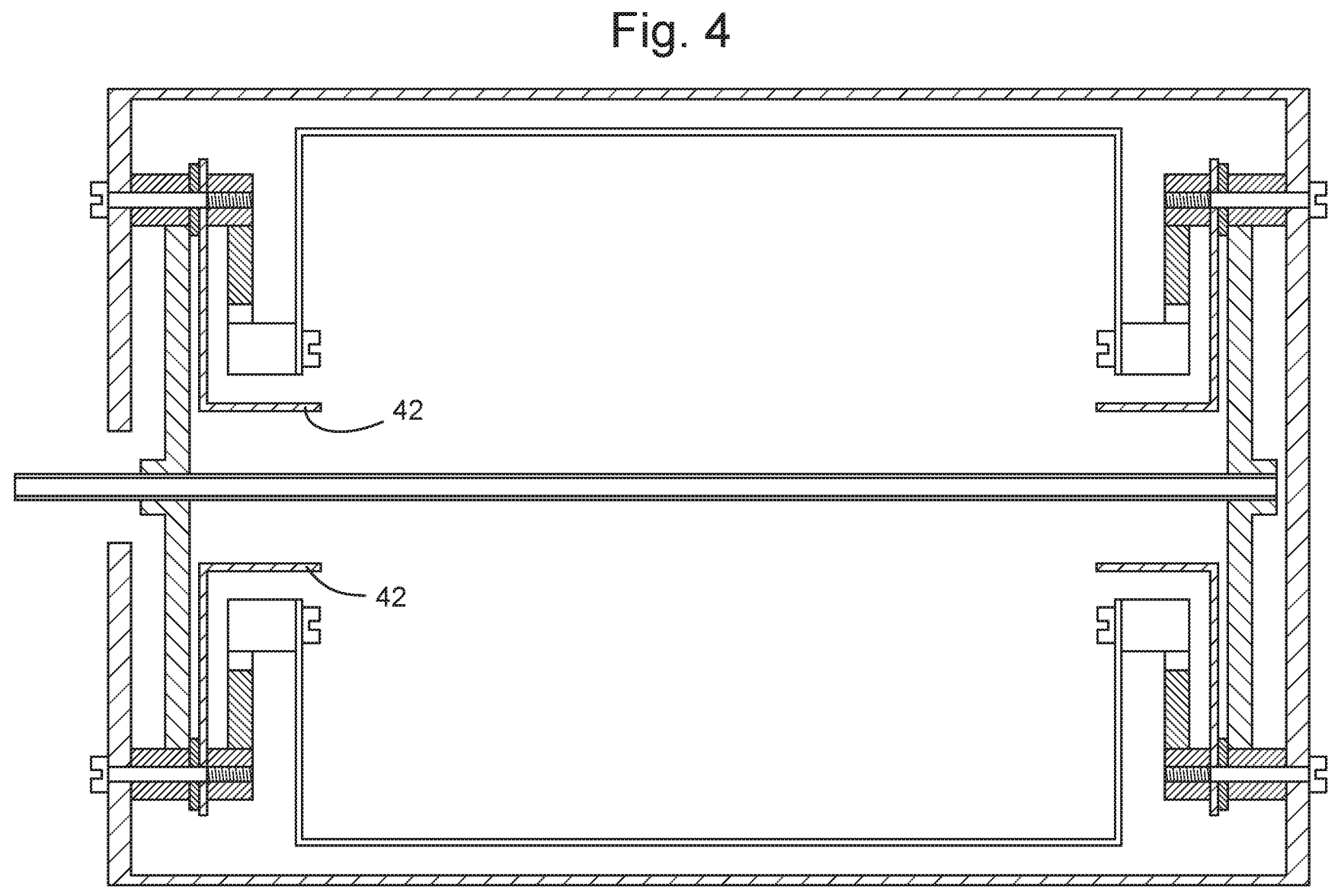

FIG. 1 shows a generic representation of the electrodes in Ion Chamber according to the prior art FIG. 2 Shows a schematic of one end of the electrodes in the Ion chamber mounted according to the present invention FIG. 3 shows details of the two sets of concentric rings and the conductive disc FIG. 4 shows a plan view of a chamber according to the present invention showing the arrangement of the insulating collar.

Figure 5A:
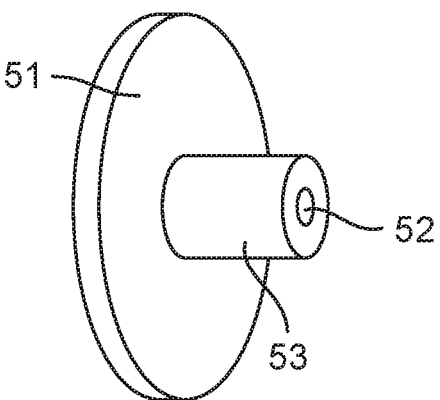
Figure 5B:
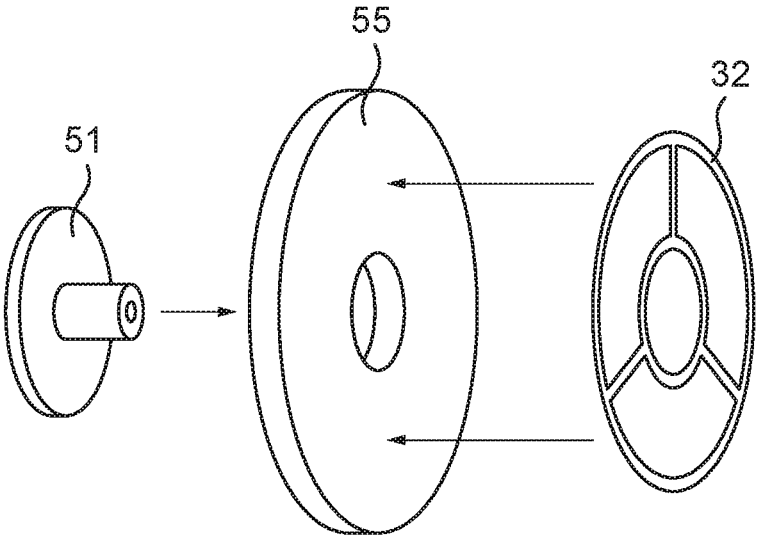

FIG. 5 shows an alternative embodiment with only one pair of concentric rings and one insulating disc In FIG. 1 we see a standard generic Ion Chamber (10). A central collection electrode (12) is mounted on an insulation means (18) to maximise leakage resistance. Insulators such as ceramic, (alumina, aluminium oxide, sometimes called sapphire by marketing) or Perspex (methyl methacrylate) are common.

Coaxially around the central collection electrode is the polarising electrode (14) which in this case is constructed of rolled and perforated metal to create a can that permits the flow of air in and out of the chamber. For a traditional thimble chamber, the central electrode is typically truncated by a distance equal to the internal radius of the polarising electrode in order to reduce capacitance.

In FIG. 2 we see the invention as used in the Ion chamber (10)

In this simplified representation, one end of the Ion chamber is shown. The Insulation means is now made of a pair of concentric rings (30, 30' and 32, 32') for each electrode. A second similar set of concentric rings is provided at the other end and the entire volume enclosed in a porous robust case such as perforated metal. These are shown in FIG. 4.

FIG. 3 shows the insulating rings in more detail. Two rings (30, 32) are joined by three spokes (34' 34" 34''' and 35 35' 35"). There is a conductive disc (36) between the two which the two electrodes do not touch.

The insulating rings are all hollow, made of an electrically insulating material such as, but not limited to, PET and in this case, manufactured by 3 D printing techniques. This hollowness increases the stiffness of the system, reducing interference from vibration. A more common material used in 3 D printing, PLA or any other suitable insulator can also be used, as design considerations dictate.

Each ring has a hub and a rim, connected by spokes. The rims are of the same diameter, which is chosen to mount the polarising electrode, so a similar diameter as the polarising electrode. There are also bosses (38) so that a set of conductive bolts can fix these to the base. One wheel's bosses are lined with a conductor such as a metal spacer, and metal washers are placed between the bosses of the two wheels. This has the effect of giving a path to earth (guarding) so that the likelihood of leakage through the rings from the polarising electrode to the collection electrode is further reduced, enhancing the effectiveness of the system.

The hub of the top ring (32') is of a greater diameter than the bottom ring (30'), so that the collection electrode can be mounted on its ring's hub, fitting through the top ring without touching it.

In order to reduce settling time, an earthed conductive disc (36) is placed to guard between the two wheels, shielding the collection wheel from the polarised central hub insulating ring. With such a disc, the washers mentioned above are not required.

By employing the disc, in experiments using the design, settling time dropped from 15 minutes to 10 s. In the electrometer, 7 pF//100 GΩ gives T=0.7 s, and 5τ allows the capacitor to reach 99% of final voltage. In such a case settling time is of the order of 3.5 s, but this is concatenated with the 10MΩ and 47 nF filter in the polarising supply (τ=0.47 s), so the observed 10 s settling time appears to be dominated by the electronics.

In order to further reduce capacitance, a conductive sleeve (42) is provided that is connected to earth, and protrudes slightly into the hollow annulus between the polarising electrode and the collection electrode. This is shown in FIG. 4. The component is co planar with the two insulating rings (30,32) and the conductive disc (36), but is formed towards its centre into a collar hub. It does not make an electrical connection with either electrode. This has been shown to halve chamber capacitance and thus further reduce noise coupled from the polarising supply.

It should be noted that in FIG. 4, the drawing depicts four spokes. Although it is likely that three at 120° is optimal, a design might dictate that a different number is beneficial.

In FIG. 5 there is presented an alternative embodiment. In 5 an insulating disc (53), mounted into a screw threaded (51) holder has a concentric aperture (52). This is configured to permit the collection electrode to fit through the centre with sufficient stiffness to stop vibration. This arrangement may then be screwed or otherwise fitted into the end of the chamber (55).

In 5*b*, this shows how disc 51 fits into the centre of concentric rings (32)

The invention claimed is:

1. An ionisation chamber, having an annular collection electrode and an annular polarising electrode, each electrode having a diameter, a proximate end and a distal end, the proximate ends of both electrodes being fixed at a base plate, wherein each electrode is supported by an insulator, wherein the insulator supporting the annular polarising electrode comprises an outer and an inner ring, said rings being concentric, the outer ring having a diameter corresponding to the diameter of the outer ring of the annular polarising electrode, and wherein the concentric rings have an electrically resistive material between them formed into spokes.

2. The ionisation chamber as claimed in claim 1 in which the annular collection electrode is supported on a second insulating wheel comprising a pair of concentric rings, the inner ring having a diameter that corresponds to the diameter of the annular collection electrode and wherein the pair of concentric rings have an electrically resistive material between them formed into spokes.

3. The ionisation chamber as claimed in claims 1 or 2 in which there are three equally spaced spokes.

4. The ionisation chamber as claimed in claims 1 or 2 in which the spokes have a hollow cross-section.

5. The ionisation chamber as claimed in claim 1 or 2 in which the insulator supporting the annular collection electrode comprises a solid disc.

6. The ionisation chamber as claimed in claims 1 or 2 wherein there is further provided an earthed conductive disc to guard between the two wheels, shielding the annular collection electrode from a polarised central hub.

7. The ionisation chamber as claimed in claims 1 or 2 wherein there is further provided an earthed conductive sleeve that extends into an annulus formed between the annular polarising electrode and the annular collection electrode.

8. The ionisation chamber as claimed in claims 1 or 2 in which the annular polarising electrode and the annular collection electrode are fixed by a second base plate at the distal end, wherein each of said electrodes is mounted on a pair of concentric insulating rings.

9. The ionisation chamber as described in claims 1 or 2 where the outer ring and the inner ring are made from PolyEthylene Terephthalate.

10. The ionisation chamber as described in claims 1 or 2 where the outer ring and the inner ring are made from Poly Lactic Acid.

11. The ionisation chamber as described in claims 1 or 2 where the outer ring and the inner ring are made using 3-D printing techniques.

* * * * *